United States Patent
Revelis et al.

(10) Patent No.: US 6,755,284 B2
(45) Date of Patent: Jun. 29, 2004

(54) ELECTRICALLY DRIVEN PARKING BRAKE ACTUATION ASSEMBLY

(75) Inventors: Peter Revelis, Ontario (CA); Michael Sykes, Ontario (CA)

(73) Assignee: Ventra Group Inc., Ontario (CA)

( * ) Notice: Subject to any disclaimer, the term of this patent is extended or adjusted under 35 U.S.C. 154(b) by 0 days.

(21) Appl. No.: 10/153,228

(22) Filed: May 23, 2002

(65) Prior Publication Data

US 2003/0132068 A1 Jul. 17, 2003

Related U.S. Application Data

(60) Provisional application No. 60/292,914, filed on May 24, 2001.

(51) Int. Cl.[7] .......................... F16D 65/36; F16D 55/08; F16C 1/22
(52) U.S. Cl. ...................... 188/2 D; 188/162; 188/73.1; 188/77 W; 192/12 BA; 74/625; 74/502.6
(58) Field of Search .............................. 188/2 D, 196 R, 188/196 M, 196 F, 196 P, 196 BA, 216, 157, 162, 72.1, 73.1, 77 W; 192/219.4–219.6, 12 BA, 12 R, 33 C; 74/502.6, 523, 526, 625; 303/20

(56) References Cited

U.S. PATENT DOCUMENTS

| | | |
|---|---|---|
| 3,791,210 A | 2/1974 | Taylor |
| 3,871,217 A | 3/1975 | Miley |
| 3,938,406 A | 2/1976 | Nisbet |
| 3,943,761 A | 3/1976 | Shoberg et al. |
| 4,158,962 A | 6/1979 | Conoval |
| 4,175,646 A | 11/1979 | Eikelberger |
| 4,205,735 A * | 6/1980 | Murray ........................ 188/16 |
| 4,245,139 A | 1/1981 | Orscheln et al. |
| 4,265,110 A | 5/1981 | Moulin |
| 4,271,718 A | 6/1981 | Bopp et al. |
| 4,318,308 A | 3/1982 | Monteillet |
| 4,373,402 A | 2/1983 | Barrett |

(List continued on next page.)

FOREIGN PATENT DOCUMENTS

| | | |
|---|---|---|
| DE | 196 53 961 A1 | 6/1998 |
| GB | 2248280 A * | 4/1992 |
| JP | 59140153 A * | 8/1984 |
| JP | 5-139269 | 6/1993 |
| JP | 8-127317 | 5/1996 |

OTHER PUBLICATIONS

U.S. 2002/0174737 to Revelis et al.*

Primary Examiner—Matthew C. Graham
Assistant Examiner—Melody M. Burch
(74) Attorney, Agent, or Firm—Pillsbury Winthrop LLP

(57) ABSTRACT

A parking brake actuation assembly is provided including an electric motor and a first rotatable member operatively connected to the electric motor so as to enable the motor to rotate the first rotatable member in a brake applying rotational direction. The first rotatable member normally is prevented against rotation in a brake releasing rotational direction. A second rotatable member is rotatable relative to the first rotatable member and includes cable attachment structure for affixing a brake activation linkage thereto. A clutch spring is disposed between the first and second rotatable members and is configured to contract upon initiation of rotation of the first rotatable member in the brake applying direction so as to couple the second rotatable member to the first rotatable member for affecting rotation of the second rotatable member in the brake applying direction.

64 Claims, 12 Drawing Sheets

U.S. PATENT DOCUMENTS

| | | | |
|---|---|---|---|
| 4,475,681 A | * 10/1984 | Ingle | 228/4.5 |
| 4,534,233 A | * 8/1985 | Hamaguchi | 74/89.2 |
| 4,561,527 A | 12/1985 | Nakamoto et al. | 192/219.4 |
| 4,569,489 A | 2/1986 | Frey et al. | |
| 4,629,043 A | 12/1986 | Matsuo et al. | 477/184 |
| 4,679,771 A | 7/1987 | Johnson | |
| 4,817,463 A | * 4/1989 | Cameron | 475/154 |
| 5,001,942 A | * 3/1991 | Boyer | 74/535 |
| 5,004,077 A | * 4/1991 | Carlson et al. | 188/2 D |
| 5,027,929 A | * 7/1991 | Ratke et al. | 477/94 |
| 5,358,219 A | 10/1994 | Shenk et al. | |
| 5,485,764 A | * 1/1996 | Sugimoto et al. | 74/535 |
| 5,542,513 A | 8/1996 | Reyes | 192/219.4 |
| 5,555,773 A | * 9/1996 | Nanno et al. | 74/512 |
| 5,667,282 A | 9/1997 | Kim | |
| 5,769,189 A | * 6/1998 | Heibel et al. | 188/156 |
| 5,813,290 A | 9/1998 | Takahashi et al. | |
| 5,868,037 A | 2/1999 | Pohling | |
| 5,910,194 A | 6/1999 | Cho | |
| 5,950,783 A | * 9/1999 | Cahill | 192/26 |
| 5,970,814 A | 10/1999 | Smith et al. | |
| 5,983,745 A | 11/1999 | Petrak | |
| 6,139,117 A | 10/2000 | Shirai et al. | |
| 6,193,022 B1 | 2/2001 | Bode | |
| 6,213,259 B1 | 4/2001 | Hanson et al. | |
| 6,223,624 B1 | 5/2001 | Iwanaga et al. | |
| 6,244,394 B1 | 6/2001 | Gutierrez et al. | 188/72.8 |
| 6,249,737 B1 | 6/2001 | Zipp | |
| 6,308,804 B1 | * 10/2001 | Roberts | 188/2 F |
| 6,386,338 B1 | 5/2002 | Powrozek | 188/156 |
| 2001/0030093 A1 | 10/2001 | Lundholm et al. | |
| 2002/0003068 A1 | 1/2002 | Sundqvist et al. | |

\* cited by examiner

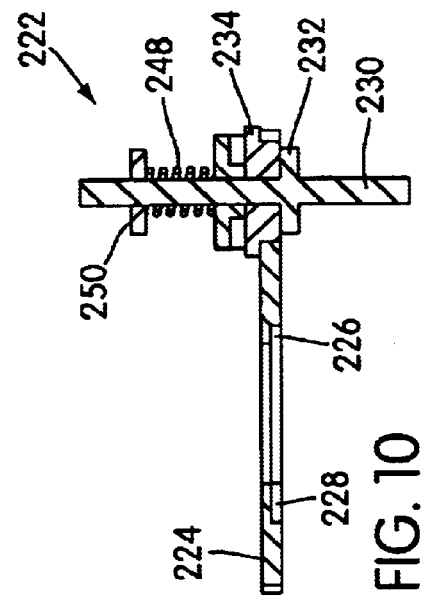
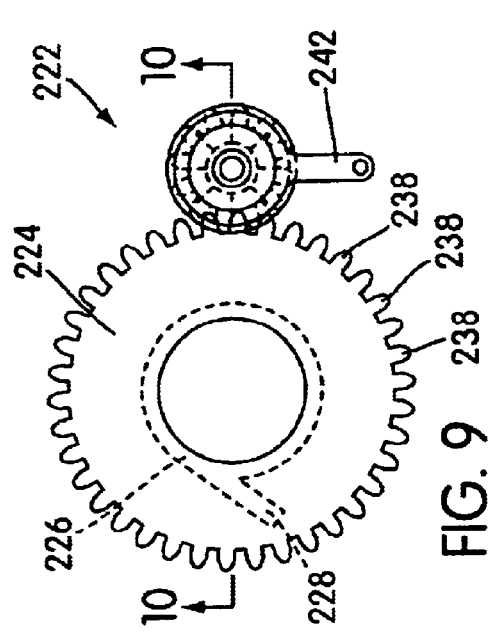
FIG. 9
FIG. 10
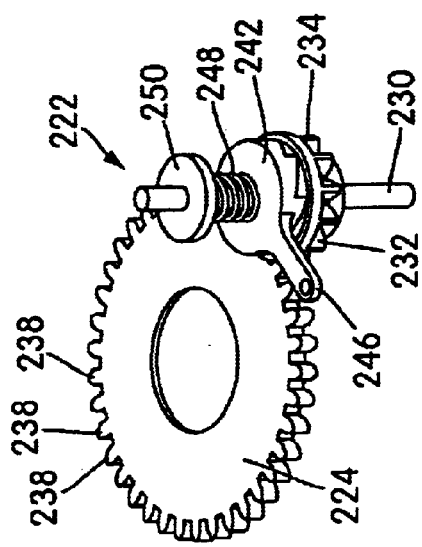
FIG. 8

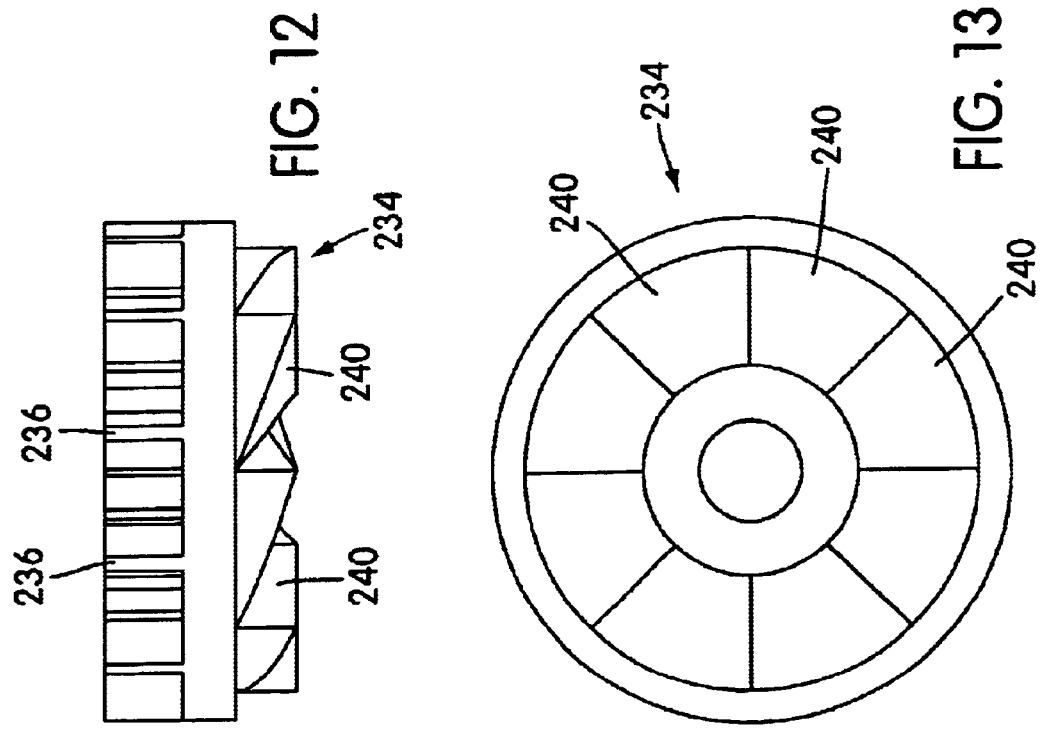
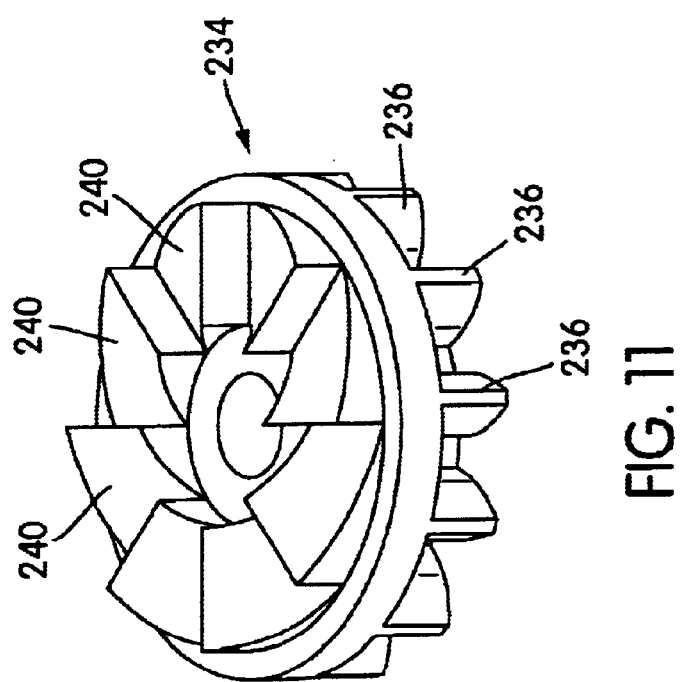

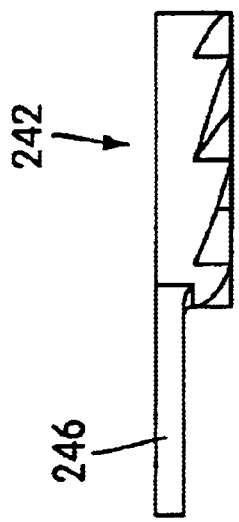
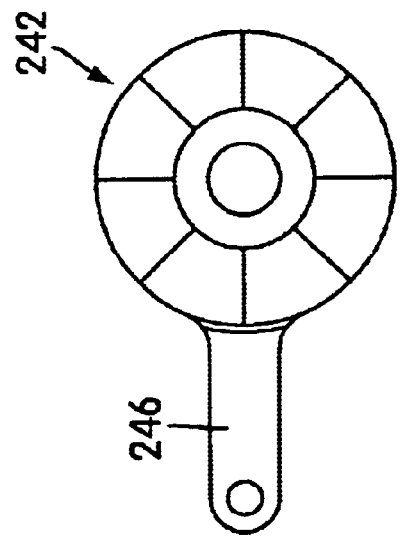
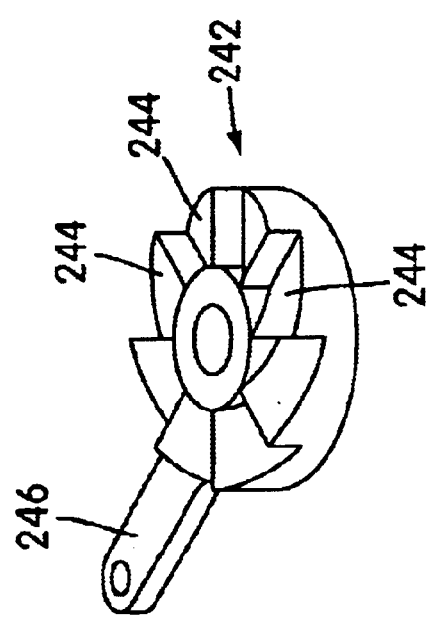

ELECTRICALLY DRIVEN PARKING BRAKE ACTUATION ASSEMBLY

The present application claims priority to U.S. Provisional Application Serial No. 60/292,914 filed May 24, 2001, the entirety of which is hereby incorporated by reference.

BACKGROUND OF THE INVENTION

1. Field of the Invention

The present invention relates to a parking brake actuation system for a motor vehicle and, more particularly, to an improved electrically driven parking brake actuation assembly that can be electrically or manually released.

2. Description of Related Art

Some automobiles or other motor vehicles are equipped with power-assisted parking brakes. A power-assisted parking brake is an electrically driven brake actuation system that allows remote actuation of the brakes of the automobile (typically only the rear brakes) to prevent movement of the automobile when parked. These systems include an electric motor and a rotational-to-linear drive mechanism for translating the rotational movement and torque of the motor to linear displacement of a brake cable mechanically connected to the brakes. Upon remote actuation, the motor rotates to effect displacement of the brake cable to set the brakes. The brakes may similarly be remotely released by effecting reverse rotation of the motor. Additionally, the brakes may be manually released with a manual override in case of automobile power failure, to allow the automobile to be moved (e.g., towed). There are several disadvantages with brake actuation systems of current design.

The manual overrides usually do not allow unrestricted movement of the brake cable and brakes back to their home (unactuated) positions. This is due to the resistance to movement inherent within the brake actuation system itself, such as in the drive mechanism and the motor. Accordingly, use of the manual override does not necessarily ensure complete release of the brakes. Forced movement of the automobile with only partially released brakes can cause wear and/or damage to the brakes.

Additionally, in order to maintain actuation of the brakes, with some systems the motor must be continuously energized to maintain a holding torque on the drive mechanism. This continuous use of the motor significantly limits the useable life of the motor and therefore the brake actuation system. Alternatively, a separate locking device may be used to allow the motor to be de-energized without allowing slippage of the brakes. However, this superfluous componentry significantly increases manufacturing costs of the brake actuation system. Moreover, addition of such a separate component increases the size of the brake actuation system and correspondingly reduces orientation and space management options available for installation of the brake actuation system into an automobile.

Furthermore, prior brake actuation systems have been integrated with componentry of the vehicles themselves and have not been readily available for add-on or retro-fitting to other vehicles.

SUMMARY OF THE INVENTION

A first aspect of the present invention provides a power-driven parking brake actuation assembly for actuating a vehicle brake system via a brake activation linkage including an electric motor and a first rotatable member operatively connected to the electric motor so as to enable the motor to rotate the first rotatable member in a brake applying rotational direction. The first rotatable member is normally prevented against rotation in a brake releasing rotational direction. A second rotatable member is rotatable relative to the first rotatable member and includes a brake linkage actuator connectable to the brake activation linkage and movable to actuate the same. A torsion clutch spring is disposed between the first and second rotatable members and is configured to contract upon initiation of rotation of the first rotatable member by the motor in the brake applying direction so as to couple the second rotatable member to the first rotatable member for affecting rotation of the second rotatable member in the brake applying direction for actuation of the brake activation linkage. The clutch spring is also configured to remain contracted as the actuated brake activation linkage applies a force to the second rotatable member in the brake releasing direction so as to keep the second rotatable member coupled to the first rotatable member. This enables the first rotatable member to prevent rotation of the second rotatable member in the brake releasing direction. A selectively actuable brake release mechanism is operatively connected to the clutch spring such that movement of the release member expands the clutch spring to de-couple the second rotatable member from the first member, thus enabling the second rotatable member to rotate in the brake releasing direction.

The release mechanism may be manually powered or electrically powered, preferably by a source separate from the vehicle's conventional main battery system, so that it can be released in the event vehicle power is lost and the main battery system is drained.

Another aspect of the present invention provides a brake actuation assembly including an electric motor having an output shaft and a drive assembly coupled to the output shaft. The brake actuation assembly also includes a pivot structure coupled to the drive assembly so as to be pivotable by the electric motor via the drive assembly. The pivot structure has connecting structure thereon configured to couple with a brake actuating linkage. The drive assembly is configured to lock in a brake actuated position upon movement thereinto. A release structure is coupled to the drive assembly to release the drive assembly from the locked brake actuated position. The release structure includes a pair of connecting portions positioned thereon at respective relative positions. Each of the connecting portions is configured to connect to a release cable assembly, such that the brake actuating assembly is capable of being disposed in two different installation orientations corresponding to the positions of the connecting portions.

These and other aspects of this invention will become apparent upon reading the following disclosure in accordance with the figures.

BRIEF DESCRIPTION OF THE DRAWINGS

FIG. 8 is a perspective view of a manual release mechanism of the brake actuation assembly shown in FIG. 7;

FIG. 9 is a top plan view of the manual release mechanism shown in FIG. 8;

FIG. 10 is a cross-sectional view of the manual release mechanism taken along line I—I in FIG. 9;

FIG. 11 is a perspective view of a release gear of the manual release mechanism shown in FIG. 8;

FIGS. 12 and 13 are front and top plan views, respectively, of the release gear shown in FIG. 11;

FIG. 14 is a perspective view of a release lever of the manual release mechanism shown in FIG. 8; and FIGS. 15 and 16 are front and top plan views, respectively, of the release lever shown in FIG. 14.

DETAILED DESCRIPTION OF EXEMPLARY EMBODIMENTS OF THE INVENTION

Figure 1:
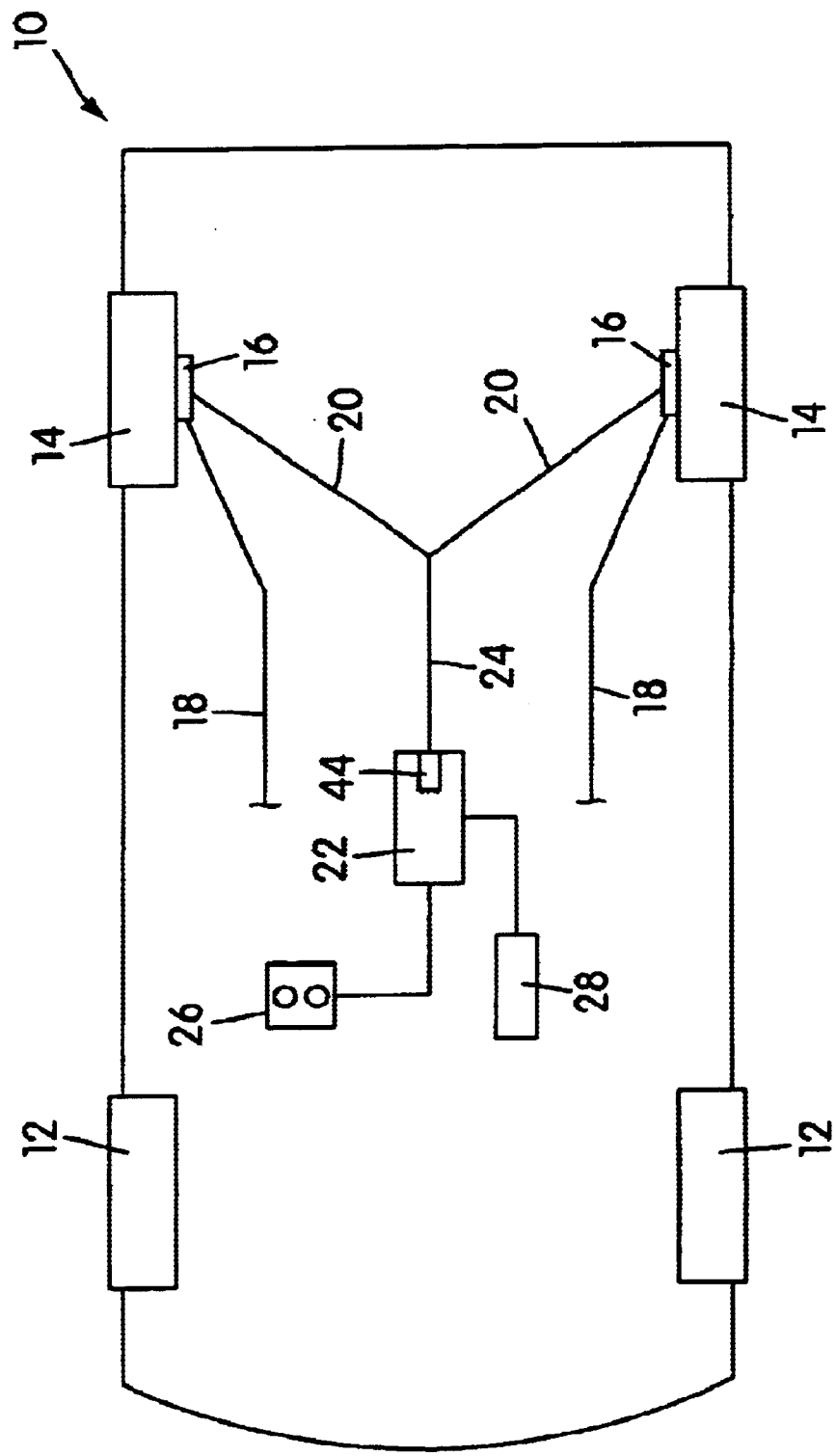
FIG. 1 is a schematic view of a vehicle equipped with a brake actuation assembly according to principles of the present invention.

FIG. 1 schematically illustrates a vehicle 10 having a pair of front wheel assemblies 12 and a pair of rear wheel assemblies 14. The rear wheel assemblies 14 each include a brake mechanism 16, e.g., drum or disk brake mechanisms, which are operable to apply a braking force to the wheel assemblies 14 in order to slow and/or stop the vehicle 10 when moving, or to prevent movement of the vehicle 10 when stopped. The brake mechanisms 16 are actuable by a hydraulic brake system including a pedal and master cylinder (not shown) and hydraulic lines 18 connected between the master cylinder and the brake mechanisms. Additionally, the brake mechanisms 16 may be mechanically actuated by a brake actuation linkage including a pair of linkages 20 coupled to a brake actuation assembly 22 via a connecting linkage 24. In the illustrated embodiment, the linkages 20, 24 are wire strand cables; however, they may be rigid linkages, such as rods. The brake actuation assembly 22 is remotely operable to electrically apply or release the brake mechanisms 16 via the linkages 20, 24 by an occupant of the vehicle 10, e.g., a driver, with an electrical control assembly 26. The electrical control assembly 26 may include, e.g., a pair of push buttons, or a two-position toggle switch positioned, e.g., within a dashboard or console of the vehicle 10 to remotely apply and release the brake mechanisms 16 via the brake actuation assembly 22. Additionally, a manual release mechanism 28 may be used to release tension within the linkages 20, 24 to release the brake mechanisms 16, such as when the vehicle 10 is not powered.

Figure 2:
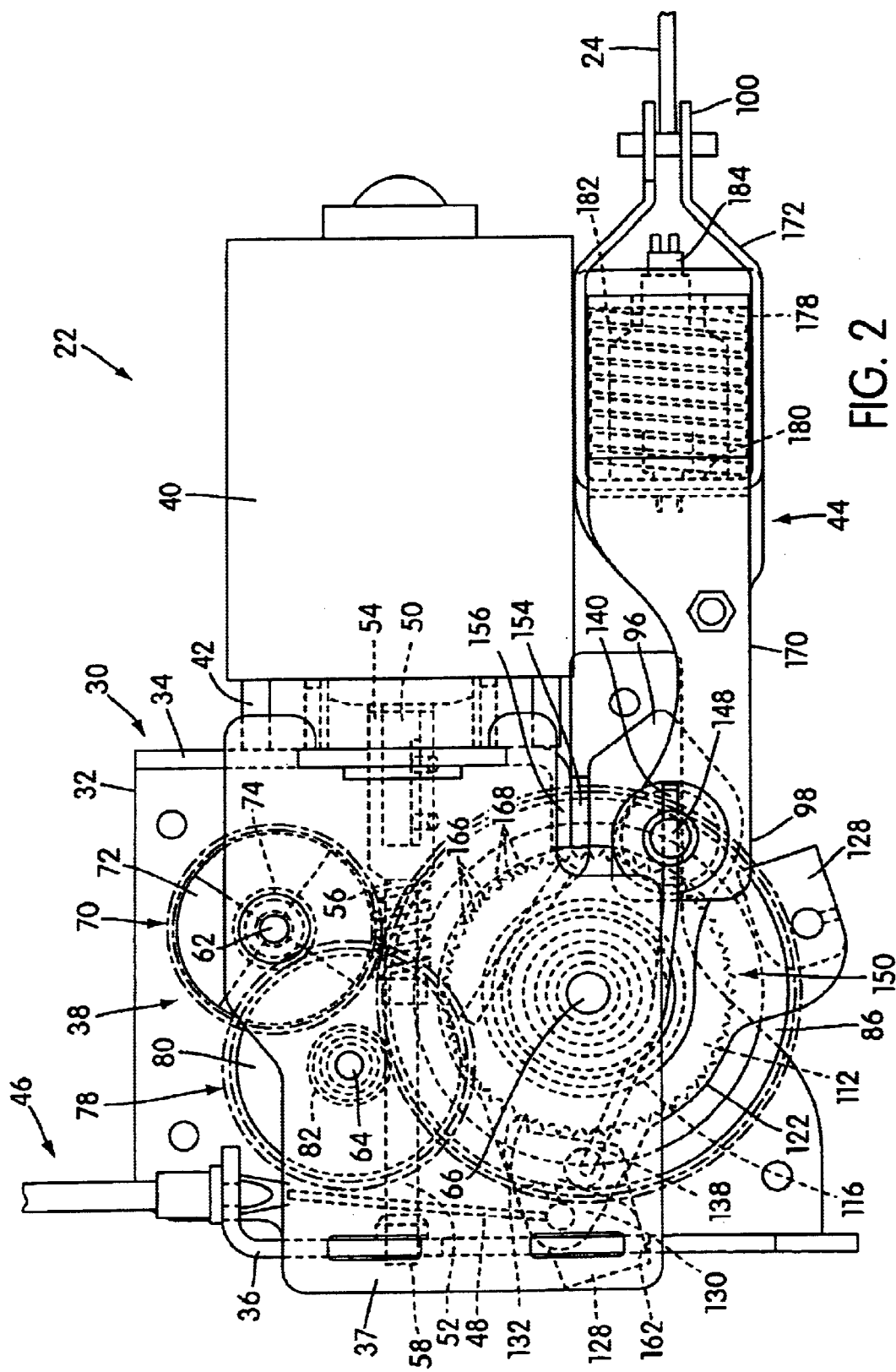
FIG. 2 is a top plan view of one embodiment of the brake actuation assembly shown in FIG. 1 in a first position.
Figure 3:
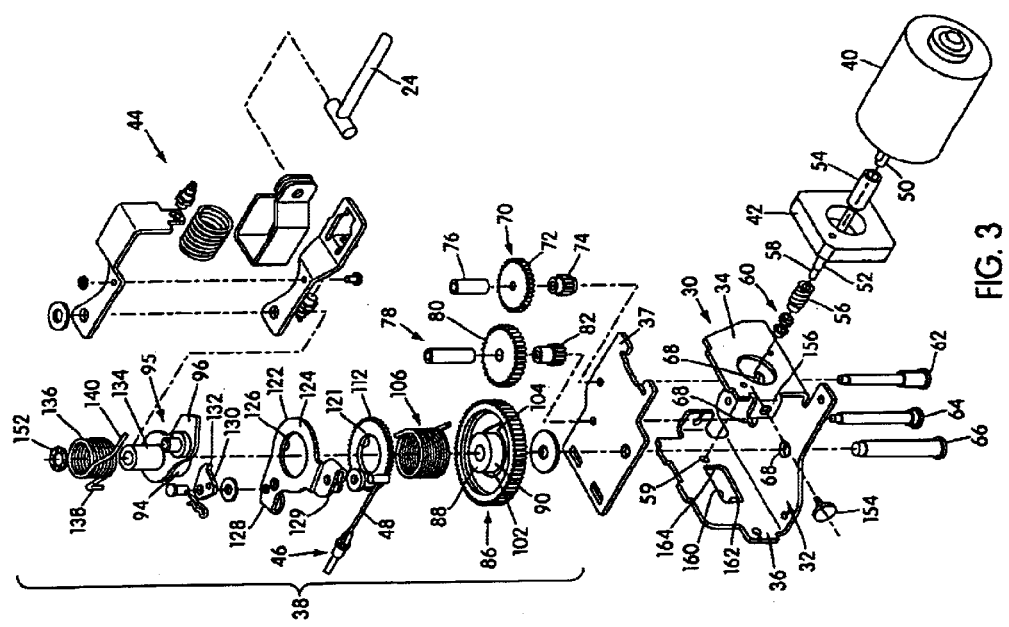
FIG. 3 is a perspective exploded view of the brake actuation assembly shown in FIG. 2.
Figure 3A:
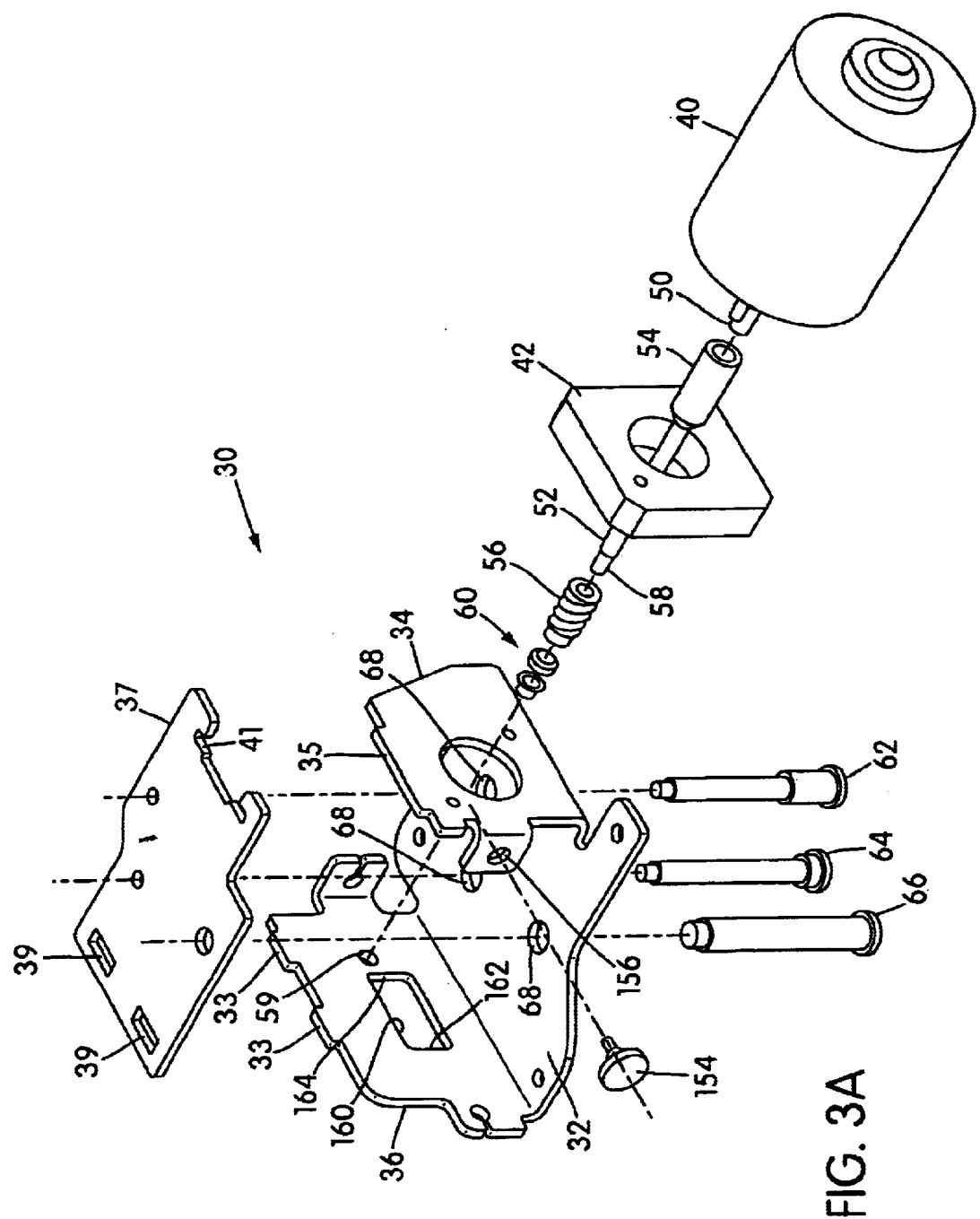
FIGS. 3A and 3B are detailed perspective exploded views of the brake actuation assembly shown in FIG. 3.

FIG. 2 shows the brake actuation assembly 22 in greater detail. The brake actuation assembly 22 includes a housing 30 having a base 32 and side wall portions 34 and 36 and a top plate 37 coupled to the side wall portions 34, 36 to form an enclosure for a drive assembly 38. FIGS. 3 and 3A show the top plate 37 including a pair of slots 39 formed therein. The slots 39 are configured to receive therein a corresponding pair of upright portions 33 on the side wall portion 36 to secure the top plate 37 to the side wall portion 36. Additionally, the top plate 37 includes a slot 41 formed in an end thereof opposite the slots 39. The slot 41 is configured to receive therein an upright portion 35 on the side wall portion 34 to secure the top plate 37 to the side wall portion 34. The housing 30 may be formed of sheet or plate metal material, or any suitably rigid material, such as a polymer or composite.

The drive assembly 38 is configured to be driven by a reversible electric motor 40 to apply and release a tension within the connecting linkage 24 to correspondingly apply and release the brake mechanisms 16. The connecting linkage 24 is connected to the drive assembly 38 via a sensing device 44, which will be discussed in greater detail below. Additionally, the manual release mechanism 28 includes a cable assembly 46 having a pull cable 48 coupled to the drive assembly 38 to allow manual release of tension within the connecting linkage 24 and thereby release the brake mechanisms 16 in a manner that will also be discussed below in greater detail.

As shown in FIG. 3, the motor 40 is connected to the side wall portion 34 with a spacer member 42 disposed therebetween by, e.g., threaded fasteners (not shown). Alternatively, the spacer member 42 may be separately connected to or formed integrally with either of the side wall portion 34 and motor 40. The motor 40 includes an armature 50 that may be coupled to a drive shaft 52 via a coupling structure 54. Alternatively, the armature 50 may be integrally formed with the drive shaft 52. The drive shaft 52 extends through aligned openings within the spacer 42 and side wall portion 34. A worm gear 56 is fixedly mounted to the drive shaft 52 (or may be integrally formed therewith) and an end portion 58 of the drive shaft 52 is rotatably supported within a receiving opening 59 formed in the side wall portion 36 such as with a bearing or journal structure 60 to facilitate rotation and flexural support of the drive shaft 52. Additionally, shafts 62, 64, 66 extend through corresponding shaft receiving openings 68 within the base 32 and are non-rotatably fixed thereto. As shown, the shafts 62, 64, 66 are oriented parallel to one another and perpendicularly to the worm 56.

A first gear structure 70 is rotatably mounted on shaft 62 within the housing 30. The first gear structure 70 includes a worm gear 72, a pinion gear 74, and a spacer 76 which may be formed separately or integrally as one piece. The worm gear 72, pinion gear 74, and spacer 76 are coaxially aligned and at least the worm gear 72 and pinion gear 74 are non-rotatably connected to each other (i.e., they are fixed for rotation together). The worm 56, being rotatable by the motor 40, is drivingly engaged in an intermeshed relation with the worm gear 72 to drive the first gear structure 70. The worm gear 72 rotatably drives the pinion gear 74 due to their integral or non-rotatable relation. A second gear structure 78 is similar to the first gear structure 70 and includes a spur gear 80, a pinion gear 82, and a spacer 84. Although shown separately, the spur gear 80, pinion gear 82, and spacer 84 may be formed integrally with one another as one piece. In any case, at least the gears 80, 82 are non-rotatably connected to one another. The pinion gear 74 of the first gear structure 70 drivingly engages the spur gear 80 of the second gear structure in an intermeshed relation, which correspondingly rotates the pinion gear 82. The pinion gear 82 drivingly engages a main gear 86 in an intermeshed relation, which is rotatably mounted on shaft 66. The main gear 86 may be of any type or construction and may be generically referred to as a non-limiting first rotatable member.

The torque at main gear 86, as well as the rotational speed thereof, is generated by the motor 40 and is delivered to the main gear 86 via the first and second gear structures 70, 78. The torque and speed of the main gear 86 may be altered by modifying the torque and speed of the motor 40 and/or by altering the relative sizes of the gears 56, 72, 74, 80, 82, and 86.

As further shown in FIG. 3, the main gear 86 includes a first shaft element 88 thereon. The main gear 86 and first shaft element 88 are preferably integrally formed as one piece, however, may be separately formed and subsequently non-rotatably coupled to one another. The first shaft element 88 is oriented concentrically with the main gear 86 and extends coaxially outwardly therefrom. The first shaft element 88 defines a circumferential outer periphery 90. The first shaft element 88 can be coupled to a second shaft element 94 of a second rotatable member to move a cable attachment structure on the second rotatable member 95. The cable attachment structure may include an activation arm 96, which is pivoted with the second rotatable member by the coupling of the first and second shaft elements 88, 94, as will be discussed in greater detail below. The second shaft element 94 is coaxially aligned with the first shaft element 88 and is formed with a diameter equal an outer diameter of the first shaft element 88. The activation arm 96 extends generally radially outwardly from the second shaft element 94. A first end 98 of the sensing device 44 is coupled to a radially outward end of the activation arm 96 and a second end 100 of the sensing device 44 is connected to the connecting linkage 24. Accordingly, when the second shaft element 94 is rotated, the activation arm 96 pivots to apply and release a tension on the connecting linkage 24 thereby applying and releasing the brake mechanisms 16.

Figure 3B:
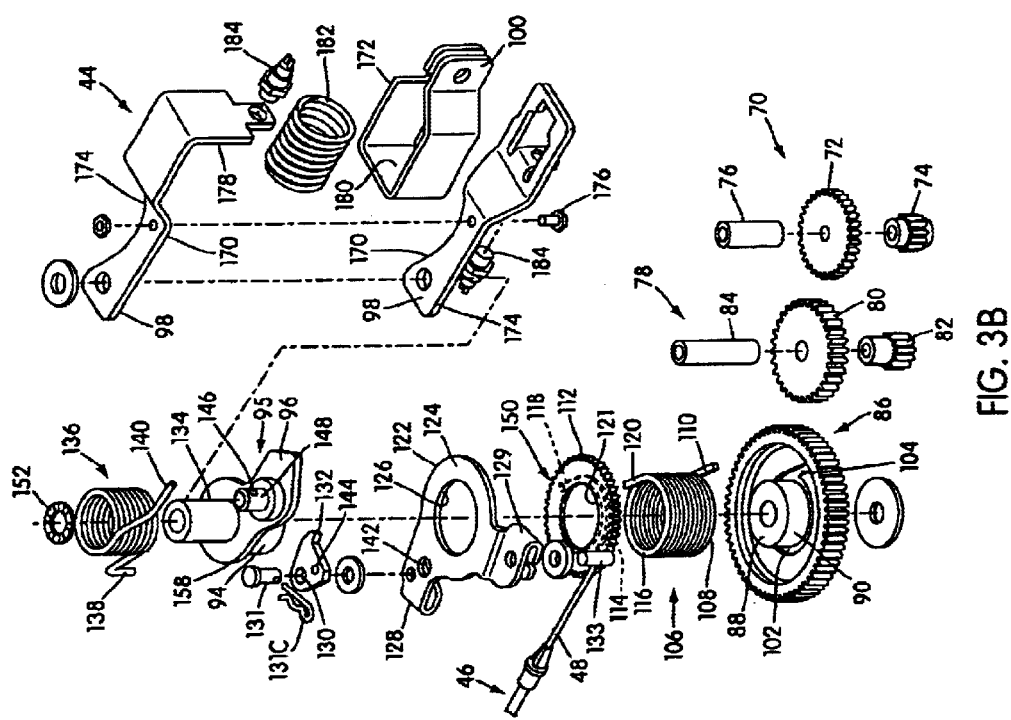

An annular groove 102 is provided within the main gear 86 along the outer periphery 90 of the first shaft element 88. The annular groove 102 includes a tangential leg 104. A clutch spring 106 in the form of a torsion spring having a plurality of circular windings includes a first end 108 that is received within the annular groove 102. A tang 110 is received within the tangential leg 104 of the annular groove 102. As shown in FIG. 3B, a release gear 112 includes an annular groove 114 formed therein so as to receive a second end 116 of the clutch spring 106. The annular groove 114 includes another tangential leg, 118 that receives an oppositely extending tang 120 of the second end 116 of the clutch spring 106. The release gear 112 is formed with a circular central opening 121 that extends axially therethrough so as to receive the second shaft element 94 therein. The release gear 112 is rotatably mounted on the second shaft element 94 and is non-rotatably coupled to the second end 116 of the clutch spring 106 via the receipt of the tang 120 in the tangential leg 118.

Figure 4:
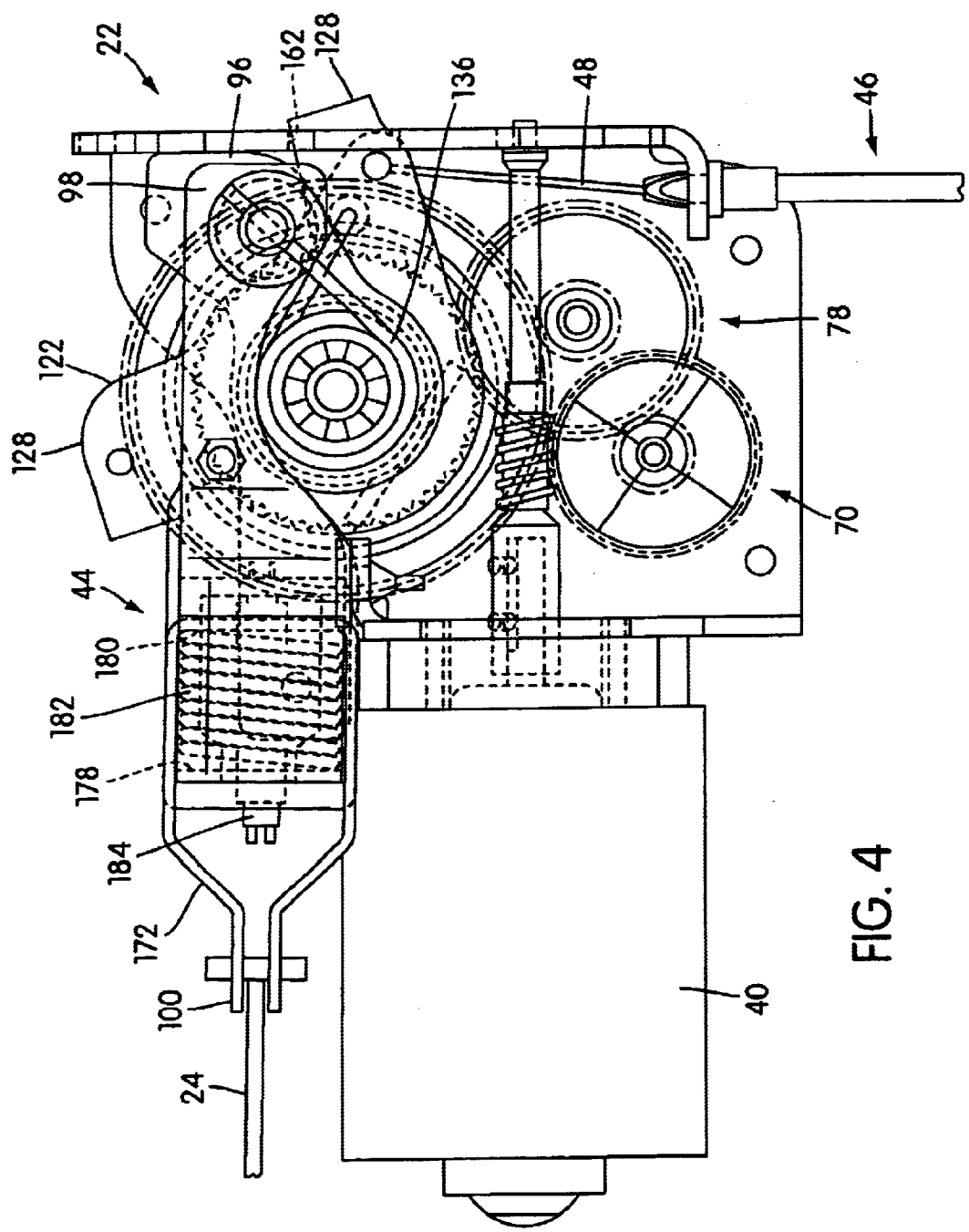
FIG. 4 is a top plan view of the brake actuation assembly shown in FIG. 2 in a second position.

A release bracket, or release lever, 122 includes an annular structure 124 defining an axially extending circular central opening 126 to rotatably receive therein the second shaft element 94. The release bracket 122 is axially disposed between the activation arm 96 and the release gear 112 on the second shaft element 94. The release bracket 122 includes a pair of radially extending connecting portions 128, 129 that are configured to fixedly receive an end of the pull cable 48. The connecting portions 128, 129 are preferably arranged on the annular structure 124 to be circumferentially spaced about 90° from one another. Although only one cable assembly 46 is needed for the manual actuator 28, forming the release bracket 122 with the pair of connecting portions 128, 129 at different relative positions provides different configuration options for installation into the vehicle 10. FIGS. 3 and 4 show the cable 48 connected to respective connecting portions 128, 129. A pivotable pawl structure 130 is mounted to the annular structure 124 adjacent the connecting portion 128. The pawl 130 includes a ratchet tooth 132 extending outwardly therefrom for engagement with the release gear 112.

Figure 5:
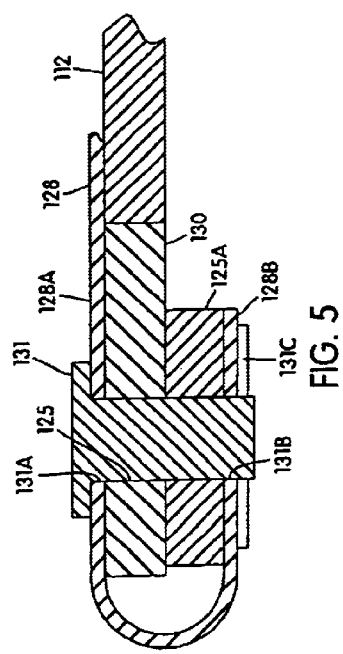
FIGS. 5–5B are cross-sectional views of connecting portions of the brake actuation assembly shown in FIG. 4.
Figure 5A:
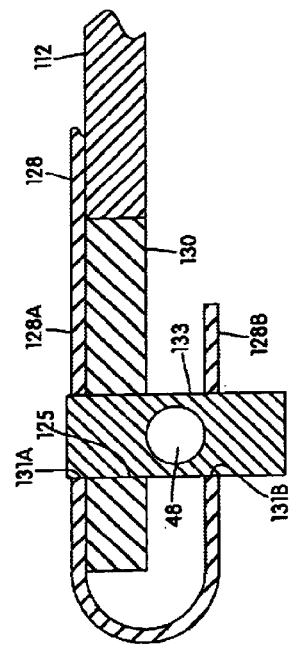
Figure 5B:
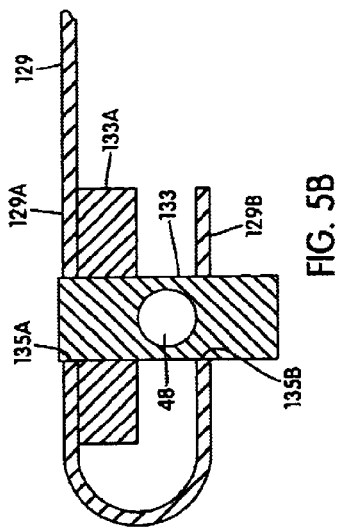

As shown in FIGS. 3B and 5, the connector portion 128 may have a generally U-shaped configuration providing spaced opposing wall structures 128A, 128B. Each wall structure 128A, 128B is formed with an opening 131A, 131B therein. In a situation such as shown in FIGS. 3B and 5, wherein the cable 48 is connected to the connector portion 129, a cylindrical retaining pin 131 is disposed within openings 131A, 131B in the wall structures 128A, 128B of the connector portion 128. The pawl structure 130 is disposed between the wall structures 128A, 128B and is pivotally secured to pin 131, which extends through a receiving opening 125 within the pawl structure 130. The pin 131 is secured within openings 131A, 131B by e.g., a clip or pin, which is indicated at 131C. A spacer 125A is positioned between the pawl structure 130 and the wall structure 128B so as to align the pawl structure 130 with the release gear 112. Referring to FIG. 5A in a case wherein the pull cable 48 is connected to connecting portion 128, a stop member, or cable stay 133 on an end of the cable 48 extends through the openings 131A, 131B in the wall structures 128A, 128B and the pawl structure 130 is pivotally mounted thereon via opening 125. In this situation, the cable 48 itself replaces the position of the spacer 125A, shown in FIG. 5, to maintain the aligned position of the pawl structure 130 with the release gear 112. In the situation wherein the cable 48 is connected to the connector portion 129, such as shown in FIGS. 3B and 5B, the stop member 133 extends through openings 135A, 135B within wall structures 129A, 129B of connector portion 129. A spacer 133A is positioned between the cable 48 and one of the wall structures 129A, 129B on the stop member 133 to limit movement of the stop member 133 within the connector portion 129. Alternatively, the spacer 125A of FIG. 5 could also be employed for connector portion 129 in place of the arrangement in FIG. 5C.

The second shaft element 94 includes an axially extending stud structure 134. In the illustrated embodiment, the stud structure 134, the activation arm 96, and the second shaft element 94 are formed integrally in one piece with one another. However, it is also possible for these components to be formed separately and subsequently non-rotatably joined to one another. A torsion spring 136 is positioned around the stud structure 134 and includes first and second torsionally biased ends 138, 140. The first end 138 extends through an oversized opening 142 within the annular structure 124 of the release bracket 122 and engages within a receiving opening 144 of the pawl structure 130. The second end 140 is received within a transverse opening 146 of an axially extending stud structure 148 on the outward end of the activation arm 96. The second end 140 of the spring 136 is not only fixed relative to the second rotatable member 95 by its receipt in opening 146, it also serves to axially retain the first end 98 of the sensing device 44 on the stud structure 148. The first end 138 of the spring 136 biases the ratchet tooth 132 of the pawl structure 130 into engagement with saw teeth 150 on an outer periphery of the release gear 112. As shown, the saw teeth 150 incline opposite the brake-actuating direction, toward the brake-releasing direction. The ratchet tooth 132 and saw teeth 150 cooperate to permit relative rotational movement of the release gear 112 and release bracket 122 in one rotational direction and prevent such movement in an opposite direction. In particular, the ratchet tooth 132 rides over ramped leading edge surfaces 166 of the teeth 150 (see FIG. 2), which effects repeated radially outwardly and inwardly pivotal movement (i.e., ratcheting movement) of the pawl structure 130 when the release gear 112 is rotated therepast in the brake-actuating direction. The ratchet tooth 132 also interlocks with overhanging trailing edge surfaces 168 (see FIG. 2) of the teeth 150 when the release gear 112 is rotated relative thereto in the brake-releasing direction. An optional spring washer 152 is disposed between the stud structure 134 and the top plate 37 to apply an axial retaining force on the components rotatably mounted to the shaft 66.

As will be discussed below, the second end 140 of the torsion spring 136 plays the additional role of biasing the activation arm 96. However, separate springs for biasing the pawl 130 and the activation arm 96 could be used instead of a single one as shown.

As discussed previously, the brake actuation assembly 22 is operable to apply and release a tension on the connecting linkage 24 so as to apply and release the brake mechanisms 16. FIG. 2 shows the brake actuation assembly 22 with its componentry in relative positions corresponding to a situation wherein a minimal amount of tension is present within the connecting linkage 24, such as when the brake mechanisms 16 are not engaged. As shown in FIG. 2, in this condition, the components of the brake actuation assembly 22 are in corresponding first positions (also referred to as brake release positions).

In particular, the activation arm 96 is moved into abutting relation with a stop structure 154 mounted to an inwardly extending tang 156 provided by the side wall portion 34. The stop structure 154 preferably serves as a bumper and is therefore formed of a resilient material such as rubber or other resilient material. Additionally, the ratchet tooth 132 of the pawl structure 130 is engaged with the saw teeth 150 of the release gear 112.

To initiate tension application to the connecting linkage 24, the motor 40 is rotated in a tension applying direction, e.g., clockwise. To accomplish this, the user need only e.g., depress a button or manipulate a switch on the electrical control assembly 26. The electrical control assembly 26 cooperates with the motor 40 such that the motor 40 is driven in the tension applying direction. The rotation of the motor 40 and torque generated thereby is transmitted through the first and second gear structures 70, 78 to the main gear 86 so as to rotate the main gear 86 in a tension applying direction, e.g., clockwise. Because the tang 110 of the clutch spring 106 is situated within the leg 104 of the annular groove 102 provided within the main gear 86, the tang 110 is rotated with the main gear 86. A residual tension within the connecting linkage 24 produced by biasing members (not shown) within the brake mechanisms 16 initially prevent rotation of the second shaft element 94. Rotation of the first shaft element 88 with the main gear 86 in the tension applying direction serves to "close" the clutch spring 106. In other words, the tension applying direction corresponds with the winding direction of coils of the clutch spring 106 and displacement thereof in the tension applying direction causes a relative decrease in diameter of the clutch spring 106. The decrease in the diameter of the clutch spring 106 causes an interior periphery of the clutch spring 106 to frictionally engage or "grasp" the outer surface 90 of the first shaft element 88 and an outer surface 158 of the second shaft element 94. The clutch spring 106 is configured such that, when in their first positions, the interior periphery of the clutch spring 106 lightly frictionally engages the outer peripheries of the first and second shaft elements 88, 94. As the first shaft element 88 rotates relative to the second shaft element 94 in the tension applying direction, the frictional engagement between the clutch spring 106 and the second shaft element 94 causes a portion of the spring 106 engaging the second shaft element 94 to "drag" along the outer periphery 158 of the second shaft element 94, thereby causing deflection of the spring 106 which tightens the windings of the spring 106 in a contracting manner on the second shaft element 94. When sufficient contraction of the spring 106 is accomplished, the first and second shaft elements 88 and 94 are non-rotatably coupled. Subsequently, the "resistance" of the brake mechanisms 16, i.e., the force generated by the biasing elements within the brake mechanisms 16, is overcome and the second shaft element 94 rotates with the first shaft element 88. Consequently, the activation arm 96 is rotated in a brake applying direction, e.g., clockwise, which serves to generate sufficient tension within the connecting linkage 24 to actuate the brake mechanisms 16.

FIG. 4 shows the components of the brake actuating assembly 22 in relative positions corresponding to a brake actuated condition, wherein the brake mechanisms 16 are applied. As shown, the activation arm 96 is in a second position thereof that is circumferentially advanced relative to the first position thereof illustrated in FIG. 2. The rotational displacement of the activation arm 96 linearly displaces the sensing device 44 and connecting linkage 24 to apply the brake mechanisms.

During assembly of the brake actuation assembly 22, the torsion spring 136 is pre-loaded so as to have a residual torsional biasing force which correspondingly provides a biasing force at the first and second ends 138, 140 thereof. As such, when the activation arm 96 is in its first position, such as shown in FIG. 2, the spring 136 biases the activation arm 96 and the release bracket 122 rotationally toward one another about the second shaft element 94. In particular, in the illustrated embodiment, the spring 136 biases the activation arm 96 in a clockwise direction, while the release bracket 122 is biased in the counterclockwise direction. A slot 160 is provided within the side wall portion 136, through which the respective connecting portion 128 of the release bracket 122 extends. The slot 160 includes first and second spaced end portions 162, 164 that define first and second positions of the release bracket 122. FIGS. 2 and 4 show the release bracket 122 in its first position, wherein the connecting portion 128 abuts the first end portion 162. The spring 136 biases the release bracket 122 into abutting engagement with the first end portion 162. Additionally, the biasing of the spring 136 serves to maintain contact between the ratchet tooth 132 and saw teeth 150 of the pawl structure 130 and release gear 112, respectively. When the activation arm 96 moves from its first position (i.e., brake release) to its second position (i.e., brake apply), the second end 140 of the spring 136 is moved relative to the first end 138, thus slightly relieving the torsional bias of the spring 136. However, the pre-loading of the spring 136 is sufficient such that movement of the activation arm 96 into its second position does not relieve a degree of biasing force on the release bracket 122 sufficient to allow the release bracket 122 to pivot out of its first position. In other words, for positions of the activation arm 96 between its first and second positions, the spring 136 resiliently biases the connecting portion 128 into abutting relation with the first end portion 162 of the slot 160. As the release gear 112 rotates with the second shaft clement 94, the pawl structure 130 undergoes a ratcheting action over the ramped leading edge surfaces 166 of the saw teeth 150 (see FIG. 2).

In the illustrated embodiment, the brake actuating assembly 22 is of a self-locking configuration, such that when the brake actuating assembly 22 is in the brake engaged condition, there is no necessity of supplying constant current to the motor 40 to prevent release of the tension within the linkages or for use of an additional locking mechanism to accomplish the same. Biasing members within the brake mechanisms 16 themselves serve to apply a torque on the second shaft element 94 in the tension releasing direction. Torque on the second shaft element 94 in the tension releasing direction is relatively equivalent to torque on the first shaft element 88 in the tension applying direction, either of which maintains constriction of the clutch spring 106 to maintain the non-rotating coupling therebetween. Accordingly, due to torque on the second shaft element 94 via the biasing members of the brake mechanisms 16 in the tension releasing direction, the first and second shaft elements 88, 94 remain non-rotatably coupled by the clutch spring 106. The interaction between the first and second gearing structures 70, 78 and the worm 56 effectively serves to prevent transmission of a significant torque to the motor 40, which would require application of a powered reactant force by the motor 40 to maintain tension on the linkage 24 and/or prevent relative rotation between the first and second shaft elements 88, 94, which would expand the clutch spring 106, thereby de-coupling the first and second shaft elements 88, 94. In particular, respective pitches of the worm gear 72 and worm 56 are configured such that a torque on the worm gear 72 being applied to the worm 56 predominantly translates into an axial force on the worm 56. The axial force generates a friction between teeth of the worm gear 72 and worm 56 that is sufficiently large to prevent movement of the worm 56, and therefore the motor 40.

To remotely release the brake mechanisms 16, the user need only e.g., depress a button or manipulate a switch on the electrical control assembly 26. The electrical control assembly 26 cooperates with the motor 40 so that the motor 40 is driven in a tension releasing direction (e.g., counter-clockwise). Rotation of the motor 40 in the tension releasing direction correspondingly drives the main gear 86 in a tension releasing direction, and thus the first shaft element 88 therewith. Rotation of the first shaft element 88 in the tension releasing direction correspondingly "opens" or expands the clutch spring 106, which thereby "relaxes" the clutch spring's engagement with the second shaft element 94. The second shaft element 94 is thereby allowed to freely rotate in the tension releasing direction to thereby release the brake mechanisms 16.

Figure 6:
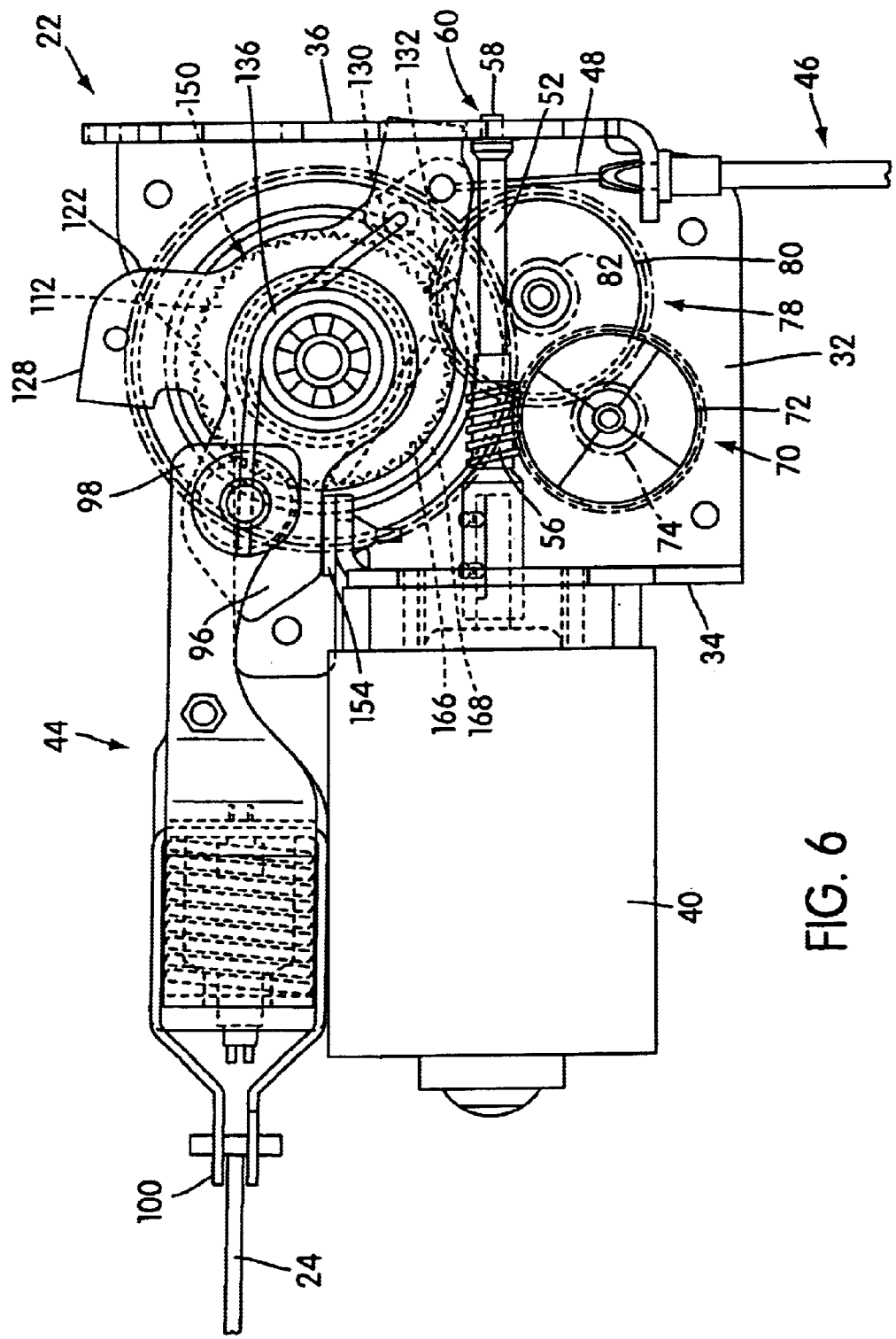
FIG. 6 is a top plan view of the brake actuation assembly shown in FIG. 2 in a third position.

FIG. 6 shows the brake actuating mechanism 22 in a manually released condition. As shown, the pull cable 48 has been manually displaced so as to pivot the release bracket 122. As discussed previously, the torsion spring 136 maintains engagement of the tooth 132 of the pawl structure 130 with the saw teeth 150 of the release gear 112. As the release gear 112 rotates relative to the release bracket 122, such as during movement of the activation arm 96 from its first to second positions, the pawl structure 130 ratchets along the saw teeth 150. However, when movement of the release bracket 122 is effected by the pull cable 48 relative to the release gear 112, the ratchet tooth 132 engages an overhanging trailing edge surface 168 of one of the saw teeth 150 and thereby non-rotatably couples the release bracket 122 and release gear 112. Because the tang 120 of the clutch spring 106 is disposed within the leg 118 of the annular groove 114, rotational movement of the release gear 112 effects relative movement between the tangs 110, 120 of the clutch spring 106. Upon a certain degree of relative movement of the tangs 110, 120, the clutch spring 106 is "relaxed" such that an internal diameter of the clutch spring 106 increases and subsequently releases the outer peripheries 90, 158 of the first and second shaft elements 88, 94. Accordingly, the second shaft element 94 and the activation arm 96 are subsequently free to rotate and are biased toward and into their first positions by the biasing members of the brake mechanisms 16. The second end portion 164 of the slot 160 acts as a second position stop to prevent movement of the release bracket 122 past its second position.

Since the brake actuating assembly 22 is operated remotely by the user, e.g., from within the vehicle, it is preferable, but not necessary, for the brake actuating assembly 22 to provide for self cut-off when predetermined positions are reached. In particular, the motor 40 may optionally be de-energized upon applying sufficient tension on the connecting linkage 24 to ensure proper application of the brake mechanisms 16. Additionally, the motor 40 may optionally be de-energized subsequent to release of the brake mechanisms 16.

Referring to FIG. 3B, a general description will now be given of the illustrated embodiment of the sensing device 44. The sensing device 44 includes first and second connecting structures 170, 172. The first connecting structure 170 includes a pair of connecting members 174, which are secured to one another with a fastener 176, such as, for example, a threaded fastener. The first connecting structure 170 provides a wall member 178 and the second connecting structure 172 provides a wall member 180. A compression spring 182 is disposed between the wall members 178, 180 and is compressed therebetween during relative movement between the first and second connecting structures 170, 172. The sensing device 44 includes a pair of switch units 184, one of which determines a maximum displacement position of the compression spring 182 and the other of which determines a minimum displacement position. Referring to FIG. 4, the brake actuating assembly 22 is shown for an applied condition of the brake mechanisms 16. The extent of rotational displacement of the activation arm 96 and, therefore, the magnitude of tension applied to connecting linkage 24, is determined by the sensing device 44. In particular, when a predetermined displacement of the compression spring 182 is sensed by one of the switch units 184, the sensing device 44 communicates with the electrical control assembly 26 to de-energize the motor 40 and thereby cease rotation of the activation arm 96. Similarly, when a minimum tension within the connecting linkage 24 is sensed by one of the switch units 184 upon release of the brake mechanisms 16, the sensing device 44 communicates with the electrical control assembly 26 to de-energize the motor 40 and thereby cease rotation of the activation arm 96. The use of the sensing device 44 is advantageous to prevent over-tensioning of the connecting linkage 24, as well as under-tensioning of the connecting linkage 24. Additionally, the brake actuating assembly 22 is rendered self-adjusting to compensate for gradual stretch of the connecting linkage 24, since the sensing device 44 de-energizes the motor 40 based on a measure of tension within the connecting linkage 24 and not a longitudinal displacement thereof. Moreover, it is possible for the brake actuation assembly 22 to be capable of applying different magnitudes of tension to the connecting linkage 24 to correspondingly generate different magnitudes of braking force by brake mechanisms 16. For example, the brake actuation assembly 22 may apply a greater tension to connecting linkage 24 when the vehicle is parked on an incline than when the vehicle is parked on a level surface. The sensing device 44 may be capable of detecting and accordingly de-energizing the motor 40 at different tension levels within the connecting linkage 24. Additionally, for this purpose, the electrical control assembly 26 may include an inclination detector (not shown).

Figure 7:
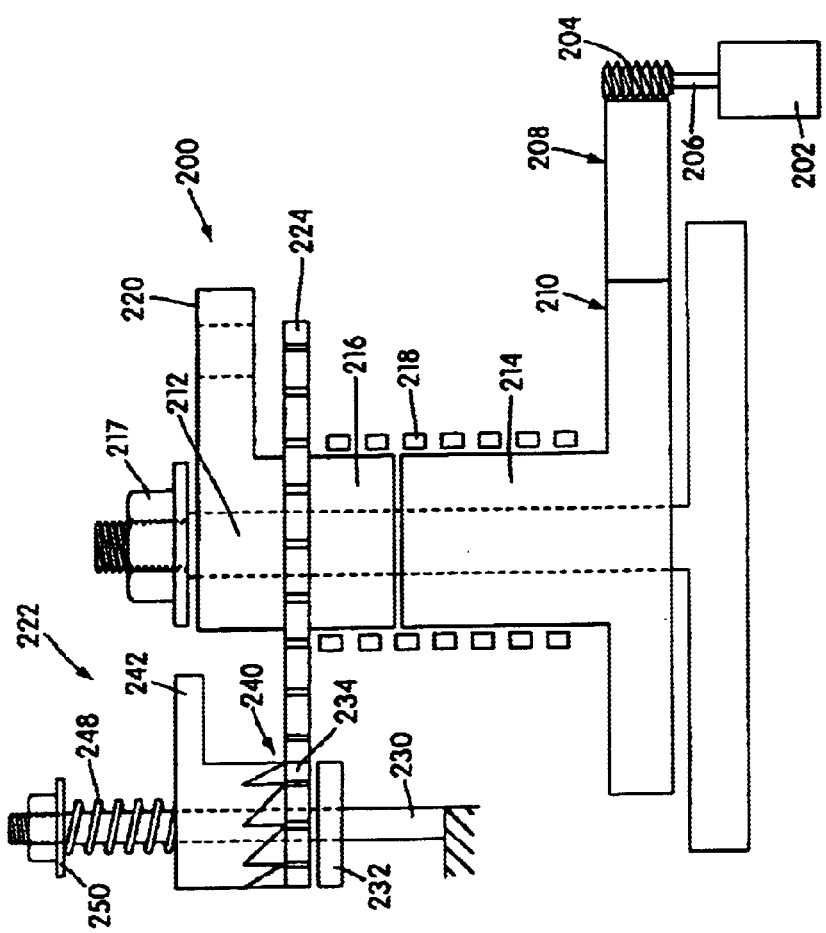
FIG. 7 is a schematic view of another embodiment of the brake actuation assembly shown in FIG. 1.

Another embodiment of a brake actuation assembly is schematically illustrated in FIG. 7 and is indicated therein at 200. The assembly 200 includes an electric motor 202 which is remotely controlled by the electrical control assembly 26, as with the brake actuation assembly 22 described above (i.e., the electrical control assembly 26 includes push-buttons or a switch to allow the user to electrically drive the motor 202 in forward or reverse directions). A worm 204 is coupled to a drive shaft 206 of the motor 202 and worm 204 drivingly engages a worm gear 208. Worm gear 208 is interposed between and intermeshed with the worm 204 and a main gear 210.

The main gear 210 is rotatably mounted on a pivot shaft 212, as are a first shaft element 214 and a second shaft element 216. The first shaft element 214 may be welded or otherwise joined to the main gear 210, or, alternatively, the first shaft element 214 and main gear 210 may be formed as a single, integral unit. The second shaft element 216 and the first shaft element 214 are able to rotate relative to each other about the pivot shaft 212. As also shown, a nut 217, or other suitable retaining structure is affixed to an end of the pivot shaft 212 to prevent substantial relative axial movement between the first and second shaft elements 214, 216. A clutch spring 218 is disposed over the first shaft element 214 and second shaft element 216 in overlapping, overlying relation between the two and is configured to permit the first shaft element 214 and the second shaft element 216 to rotate relative to each other in one direction (a tension releasing direction) but to non-rotatably lock in the opposite direction (a tension applying direction).

An activation arm 220 extends generally radially outwardly from the second shaft element 216 and may be welded to or integrally formed with the second shaft element 216. The connecting linkage 24 is coupled to cable attachment member 220.

With this arrangement, the motor 202 drives the worm 204, which, in turn, drives the worm gear 208 and hence the main gear 210. This causes the first shaft element 214 to rotate in the tension applying direction. The rotation of the first shaft element 214 in the tension applying direction causes the clutch spring 218 to close around the second shaft element 216 and thereby non-rotatably couple the second shaft element 216 with the first shaft element 214 such that the second shaft element 216 also turns in the brake-applying direction, thereby pulling the connecting linkage 24 so as to actuate the brake mechanisms 16. Driving electric power to the motor 202 may be terminated simply by releasing the brake-actuating button, or, preferably, by having the connecting linkage 24 include a sensing device, such as sensing device 44 described above, which detects a predetermined maximum tension applied to the connecting linkage 24. The interconnection between the first shaft element 214 and second shaft element 216 via the clutch spring 218, and the gears 210, 208, 204, provide sufficient rigidity to prevent backward, tension releasing rotation of the second shaft element 216 about the pivot shaft 212.

The brake actuation system 200 may be released either by driving the motor 202 in a reversed direction to release the spring clutch 218 or may be manually released. That is so that the parking brake can be released even when all power to the system is lost, thereby permitting, for example, towing if necessary. A contemplated manual release mechanism 222 is illustrated in FIGS. 8–16.

A release gear 224 is mounted over second shaft element 216 and is rotationally free relative thereto. As illustrated in FIG. 9, a clutch spring-receiving groove 226 is formed in the bottom surface of the release gear 224. The release gear 224 fits down on top of the clutch spring 218, and an upper tang (not shown) of the clutch spring 218 fits within tang-receiving groove extension 228. (The opposite tang of the clutch spring 218 (also not shown), at the opposite end of the clutch spring, is secured relative to the main gear 210 by a post which prevents free, unrestrained rotation of the clutch spring 218 relative to the first and second shaft elements 214, 216.)

The release mechanism 222 further includes a ratcheted release lever assembly. In particular, the release lever assembly includes a post 230 with a supporting flange or collar 232. A toothed release gear 234 is rotationally supported on the post 230 by means of flange or collar 232. Teeth 236 of the toothed release gear 234 intermesh with teeth 238 of the release gear 224 such that the two release gears 224, 234 counter-rotate with each other. As shown in FIG. 11, the toothed release gear 234 has ramped ratchet teeth 240 formed on an axially outwardly facing side of the toothed release gear 234 opposite the teeth 236.

Referring to FIGS. 14–16, a release bracket, or release lever, 242 fits rotationally over post 230 and includes ramped ratchet teeth 244 that interengage with the ramped ratchet teeth 240 of the toothed release gear 234. Thus, the release lever 242 and the toothed release gear 234 are able to rotate relative to each other in one direction (with the two members moving axially away from each other and back toward each other as their respective ramped teeth slide past each other), but are unable to rotate relative to each other in the opposite direction (by virtue of flush engagement between the respective "vertical" faces of their respective ramped teeth) such that the two members are forced to rotate together. The release lever 242 further has a release cable connecting portion 246. A compression spring 248 is provided over post 230 (between a retaining washer 250 and the surface of the release lever 242) so as to bias the release lever 242 into engagement with the toothed release gear 234.

The release mechanism 222 operates as follows. As the parking brake is being engaged, the clutch spring 218 rotates in an engagement direction, and the release gear 224 rotates in the same direction, i.e., with the clutch spring, by virtue of the clutch spring fitting within the groove and groove extension 226 and 228. As the release gear 224 rotates, it drives the toothed release gear 234, which is able to rotate past or relative to the release lever 242 as their teeth slide past each other (with the release lever 242 moving axially back and forth along the post 230 against the bias of the compression spring 248).

In order to release the parking brake, the manual actuator 28 (FIG. 1), which is coupled to the release cable connecting portion 246 via, e.g., cable assembly 46, is pulled (e.g., from the passenger compartment of the vehicle), which causes the release lever 242 to rotate in the opposite direction. The ratchet-type engagement between the release lever 242 and the toothed release gear 234 causes the release lever 242 to force the toothed release gear 234 to rotate in the opposite direction, thereby also causing the release gear 224 to rotate in its respective opposite direction. This forces the clutch spring 218 to open slightly, thereby releasing its grip on the second shaft element 216 and permitting the second shaft element 216 to rotate on the pivot shaft 212 relative to the first shaft element 214. This allows the parking brake to be released as the second shaft element 216 returns to a "home" position. Preferably, a compression spring (not shown) surrounds the release cable (not shown) and is configured to urge the release cable, and hence the release lever, back to a neutral position as illustrated.

An extension spring may be provided between the activation arm 220 and, e.g., an assembly housing. That extension spring is used to maintain tension in the connecting linkage 24 when the cable is in its "home" position. Alternatively, tension may be maintained within the connecting linkage 24 via the brake mechanisms 126 themselves. In this case, it is preferable for the assembly housing to provide a stop structure to rigidly limit the movement of the cable attachment member 220.

Various modifications to and departures from the embodiment disclosed herein will occur to those having skill in the art and are deemed to be within the scope of the following claims.

What is claimed is:

1. A power-driven parking brake actuation assembly for actuating a vehicle brake system via a brake activation linkage, the power-driven parking brake actuation assembly comprising:
   an electric motor;
   a first rotatable member operatively connected to the electric motor so as to enable the motor to rotate the first rotatable member in a brake applying rotational direction, the first rotatable member normally being prevented against rotation in an opposite brake releasing rotational direction;
   a second rotatable member rotatable relative to the first rotatable member, the second rotatable member including a brake linkage actuator connectable to the brake activation linkage movable to actuate the brake activation linkage;
   a torsion clutch spring disposed between the first and second rotatable members, the torsion clutch spring being configured to contract upon initiation of rotation of the first rotatable member by the motor in the brake applying direction so as to couple the second rotatable member with the first rotatable member for affecting rotation of the second rotatable member in the brake applying direction for actuation of the brake activation linkage, the clutch spring also contracting upon initiation of rotation of the second rotatable member in the brake releasing direction so as to couple the second rotatable member with the first rotatable member for enabling the first rotatable member to prevent rotation of the second rotatable member in the brake releasing direction; and
   a manually actuable brake release mechanism including a manually movable release member mechanically connected to the clutch spring such that manual movement of the release member expands the clutch spring to de-couple the first and second rotatable members, thus enabling the second rotatable member to rotate in the brake releasing direction,
   wherein the clutch spring expands upon initiation of rotation of the first rotatable member in the brake releasing direction and wherein the motor is reversible to rotate the first rotatable member in the brake releasing direction opposite the brake applying direction to expand the clutch spring and de-couple the first and second rotatable members, thus enabling the second rotatable member to rotate in the brake releasing direction.

2. A brake actuation assembly according to claim 1, further comprising a gear train connecting the motor to the first rotatable member, the construction of the gear train being such that it normally prevents the first rotatable member from rotating in the brake releasing direction except by powered rotation by the motor.

3. A brake actuation assembly as in claim 2, wherein the gear train includes a worm rotatable by the motor and being intermeshed with a worm gear coupled to said first rotatable member.

4. A brake actuation assembly as in claim 3, wherein said first rotatable member includes a main gear fixedly connected thereto.

5. A brake actuation assembly as in claim 4, wherein said gear train includes an intermediate gear interposed between said worm gear and said main gear.

6. A brake actuation assembly as in claim 5, wherein said intermediate gear is intermeshed with said worm gear.

7. A brake actuation assembly as in claim 6, wherein said intermediate gear is intermeshed with an additional intermediate gear.

8. A brake actuation assembly as in claim 1, wherein said first and second rotatable members are defined by respective first and second generally cylindrical, axially extending shaft elements.

9. A brake actuation assembly as in claim 8, wherein said first and second shaft elements are coaxially aligned with one another.

10. A brake actuation assembly as in claim 1, wherein said brake linkage actuator includes an activation arm fixedly mounted to said second rotatable member and extending generally radially outwardly therefrom and including structure thereon configured to connect to the brake actuation linkage.

11. A brake actuation assembly as in claim 10, wherein said manually actuable release mechanism includes a release gear rotatable relative to said second rotatable member and being fixedly mounted to an end of said clutch spring.

12. A brake actuation as in claim 11, wherein said manually actuable release mechanism includes a release structure configured to allow relative rotational movement between said release structure and said release gear in an actuating direction and to prevent relative rotational movement therebetween in an opposite releasing direction.

13. A brake actuation assembly as in claim 12, wherein said release structure is coupled to a manually actuable cable assembly so as to be manually rotatable in the releasing direction thereby and being configured to effect rotation of said release gear to release said clutch spring.

14. A brake actuation assembly as in claim 13, wherein said release gear includes a plurality of peripherally spaced teeth thereon.

15. A brake actuation assembly as in claim 14, wherein said release structure is rotatably mounted on said second rotatable member.

16. A brake actuation assembly as in claim 15, wherein said release structure includes a pawl structure pivotably connected thereto and configured to be interlockable with said teeth of said release gear, thereby allowing relative rotational movement between said release gear and said release structure in the actuating direction and non-rotatably coupling said release gear and said release structure in said releasing direction.

17. A brake actuation assembly as in claim 16, wherein said manually actuable brake release mechanism includes a torsion spring coupled between said pawl structure and said activation arm to resiliently bias said pawl structure into interengagement with said teeth of said release gear.

18. A brake actuation assembly as in claim 11, wherein said release member is axially disposed on said second rotatable member between said release gear and said activation arm.

19. A brake actuation assembly as in claim 13, wherein said manually actuable brake release mechanism includes a toothed release gear being rotationally coupled with said release gear mounted to the end of said clutch spring.

20. A brake actuation assembly as in claim 19, wherein said toothed release gear includes a plurality of generally axially outwardly extending ramped teeth thereon and said release structure includes a plurality of generally axially outwardly extending ramped teeth thereon, said pluralities of ramped teeth interengaging with each other to allow relative rotational movement between said toothed release gear and said release structure in an actuating direction and to non-rotatably couple said toothed release gear and said release structure in an opposite releasing direction.

21. A brake actuation assembly as in claim 19, wherein said manually actuable brake release mechanism includes a compression spring configured to resiliently maintain the interengagement of said pluralities of ramped teeth.

22. A brake actuation assembly as in claim 1, further comprising a sensing device constructed to measure an amount of tension present within the brake actuation linkage, said sensing device being communicated with said motor to de-energize said motor when a predetermined maximum tension is applied to the brake actuation linkage.

23. A brake actuation assembly comprising:
an electric motor having an output shaft;
a drive assembly coupled to said output shaft;
a pivot structure coupled to said drive assembly so as to be pivotable by said electric motor via said drive assembly, said pivot structure having connecting structure thereon configured to couple with a brake actuating linkage; wherein said drive assembly is configured to lock in a brake-actuated position upon movement thereinto,
a release structure coupled to said drive assembly to release said drive assembly from the locked brake-actuated position, the release structure including a pair of connecting portions positioned thereon at respective relative positions, each of said connecting portions being connectable to a release cable assembly, such that in a first installation orientation one of the pair of connecting portions is connected to the release cable assembly, and in a second installation orientation, different from the first installation orientation, the other of the pair of connecting portions is connected to the release cable assembly, thereby enabling the brake actuation assembly to be disposed in two different installation orientations corresponding to the positions of the pair of connecting portions.

24. A power-driven parking brake actuation assembly for actuating a vehicle brake system via a brake activation linkage, the power-driven parking brake actuation assembly comprising:
an electric motor;
a first rotatable member operatively connected to the electric motor so as to enable the motor to rotate the first rotatable member in a brake applying rotational direction, the first rotatable member normally being prevented against rotation in a brake releasing rotational direction;
a second rotatable member rotatable relative to the first rotatable member, the second rotatable member including a brake linkage actuator connectable to the brake activation linkage movable to actuate the brake activation linkage;
a torsion clutch spring disposed between the first and second rotatable members, the torsion clutch spring being configured to contract upon initiation of rotation of the first rotatable member by the motor in the brake applying direction so as to couple the second rotatable member with the first rotatable member for affecting rotation of the second rotatable member in the brake applying direction for actuation of the brake activation linkage, the clutch spring also being configured to contract upon initiation of rotation of the second rotatable member in the brake releasing direction so as to couple the second rotatable member with the first rotatable member for enabling the first rotatable member to prevent rotation of the second rotatable member in the brake releasing direction;
a manually actuable brake release mechanism including a manually movable release member mechanically connected to the clutch spring such that manual movement of the release member expands the clutch spring to de-couple the first and second rotatable members, thus enabling the second rotatable member to rotate in the brake releasing direction; and
a gear train connecting the motor to the first rotatable member, the gear train including a worm rotatable by the motor and being intermeshed with a worm gear coupled to said first rotatable member, the construction of the gear train being such that it normally prevents the first rotatable member from rotating in the brake releasing direction except by powered rotation by the motor,
wherein the motor is reversible and wherein the clutch spring is configured to expand upon initiation of rotation of the first rotatable member by the motor in the brake releasing direction so as to de-couple the first and second rotatable members, thus enabling the second rotatable member to rotate in the brake releasing direction, and
wherein said first rotatable member includes a main gear fixedly connected thereto.

25. A brake actuation assembly as in claim 24, wherein said first and second rotatable members are defined by respective first and second generally cylindrical, axially extending shaft elements.

26. A brake actuation assembly as in claim 25, wherein said first and second shaft elements are coaxially aligned with one another.

27. A brake actuation assembly as in claim 24, wherein said gear train includes an intermediate gear interposed between said worm gear and said main gear.

28. A brake actuation assembly as in claim 27, wherein said intermediate gear is intermeshed with said worm gear.

29. A brake actuation assembly as in claim 28, wherein said intermediate gear is intermeshed with an additional intermediate gear.

30. A brake actuation assembly as in claim 24, wherein said brake linkage actuator includes an activation arm fixedly mounted to said second rotatable member and extending generally radially outwardly therefrom and including structure thereon configured to connect to the brake actuation linkage.

31. A brake actuation assembly as in claim 30, wherein said manually actuable release mechanism includes a release gear rotatable relative to said second rotatable member and being fixedly mounted to an end of said clutch spring.

32. A brake actuation assembly as in claim 31, wherein said manually actuable release mechanism includes a release structure configured to allow relative rotational movement between said release structure and said release gear in an actuating direction and to prevent relative rotational movement therebetween in an opposite releasing direction.

33. A brake actuation assembly as in claim 32, wherein said release structure is coupled to a manually actuable cable assembly so as to be manually rotatable in the releasing direction thereby and being configured to effect rotation of said release gear to release said clutch spring.

34. A brake actuation assembly as in claim 33, wherein said release gear includes a plurality of peripherally spaced teeth thereon.

35. A brake actuation assembly as in claim 34, wherein said release structure is rotatably mounted on said second rotatable member.

36. A brake actuation assembly as in claim 35, wherein said release structure includes a pawl structure pivotably connected thereto and configured to be interlockable with said teeth of said release gear, thereby allowing relative rotational movement between said release gear and said release structure in the actuating direction and non-rotatably coupling said release gear and said release structure in said releasing direction.

37. A brake actuation assembly as in claim 36, wherein said manually actuable brake release mechanism includes a torsion spring coupled between said pawl structure and said activation arm to resiliently bias said pawl structure into interengagement with said teeth of said release gear.

38. A brake actuation assembly as in claim 31, wherein said release member is axially disposed on said second rotatable member between said release gear and said activation arm.

39. A brake actuation assembly as in claim 33, wherein said manually actuable brake release mechanism includes a toothed release gear being rotationally coupled with said release gear mounted to the end of said clutch spring.

40. A brake actuation assembly as in claim 39, wherein said toothed release gear includes a plurality of generally axially outwardly extending ramped teeth thereon and said release structure includes a plurality of generally axially outwardly extending ramped teeth thereon, said pluralities of ramped teeth interengaging with each other to allow relative rotational movement between said toothed release gear and said release structure in an actuating direction and to non-rotatably couple said toothed release gear and said release structure in an opposite releasing direction.

41. A brake actuation assembly as in claim 39, wherein said manually actuable brake release mechanism includes a compression spring configured to resiliently maintain the interengagement of said pluralities of ramped teeth.

42. A brake actuation assembly as in claim 24, further comprising a sensing device constructed to measure an amount of tension present within the brake actuation linkage, said sensing device being communicated with said motor to de-energize said motor when a predetermined maximum tension is applied to the brake actuation linkage.

43. A power-driven parking brake actuation assembly for actuating a vehicle brake system via a brake activation linkage, the power-driven parking brake actuation assembly comprising:

an electric motor;

a first rotatable member operatively connected to the electric motor so as to enable the motor to rotate the first rotatable member in a brake applying rotational direction, the first rotatable member normally being prevented against rotation in a brake releasing rotational direction;

a second rotatable member rotatable relative to the first rotatable member, the second rotatable member including a brake linkage actuator that includes an activation arm fixedly mounted to said second rotatable member and extending generally radially outwardly therefrom and including structure thereon configured to connect to the brake activation linkage, the brake linkage actuator movable to actuate the brake activation linkage;

a torsion clutch spring disposed between the first and second rotatable members, the torsion clutch spring being configured to contract upon initiation of rotation of the first rotatable member by the motor in the brake applying direction so as to couple the second rotatable member with the first rotatable member for affecting rotation of the second rotatable member in the brake applying direction for actuation of the brake activation linkage, the clutch spring also being configured to contract upon initiation of rotation of the second rotatable member in the brake releasing direction so as to couple the second rotatable member with the first rotatable member for enabling the first rotatable member to prevent rotation of the second rotatable member in the brake releasing direction; and a manually actuable brake release mechanism including a manually movable release member mechanically connected to the clutch spring such that manual movement of the release member expands the clutch spring to de-couple the first and second rotatable members, thus enabling the second rotatable member to rotate in the brake releasing direction, wherein said manually actuable release mechanism includes a release gear rotatable relative to said second rotatable member and being fixedly mounted to an end of said clutch spring, and wherein said manually actuable release mechanism includes a release structure configured to allow relative rotational movement between said release structure and said release gear in an actuating direction and to prevent relative rotational movement therebetween in an opposite releasing direction.

44. A brake actuation assembly according to claim 43, wherein the motor is reversible and wherein the clutch spring is configured to expand upon initiation of rotation of the first rotatable member by the motor in the brake releasing direction so as to de-couple the first and second rotatable members, thus enabling the second rotatable member to rotate in the brake releasing direction.

45. A brake actuation assembly according to claim 44, further comprising a gear train connecting the motor to the first rotatable member, the construction of the gear train being such that it normally prevents the first rotatable member from rotating in the brake releasing direction except by powered rotation by the motor.

46. A brake actuation assembly as in claim 45, wherein the gear train includes a worm rotatable by the motor and being intermeshed with a worm gear coupled to said first rotatable member.

47. A brake actuation assembly as in claim 46, wherein said first rotatable member includes a main gear fixedly connected thereto.

48. A brake actuation assembly as in claim 47, wherein said gear train includes an intermediate gear interposed between said worm gear and said main gear.

49. A brake actuation assembly as in claim 48, wherein said intermediate gear is intermeshed with said worm gear.

50. A brake actuation assembly as in claim 49, wherein said intermediate gear is intermeshed with an additional intermediate gear.

51. A brake actuation assembly as in claim 43, wherein said first and second rotatable members are defined by respective first and second generally cylindrical, axially extending shaft elements.

52. A brake actuation assembly as in claim 51, wherein said first and second shaft elements are coaxially aligned with one another.

53. A brake actuation assembly as in claim 43, wherein said release structure is coupled to a manually actuable cable assembly so as to be manually rotatable in the releasing direction thereby and being configured to effect rotation of said release gear to release said clutch spring.

54. A brake actuation assembly as in claim 53, wherein said release gear includes a plurality of peripherally spaced teeth thereon.

55. A brake actuation assembly as in claim 54, wherein said release structure is rotatably mounted on said second rotatable member.

56. A brake actuation assembly as in claim 55, wherein said release structure includes a pawl structure pivotably connected thereto and configured to be interlockable with said teeth of said release gear, thereby allowing relative rotational movement between said release gear and said release structure in the actuating direction and non-rotatably coupling said release gear and said release structure in said releasing direction.

57. A brake actuation assembly as in claim 56, wherein said manually actuable brake release mechanism includes a torsion spring coupled between said pawl structure and said activation arm to resiliently bias said pawl structure into interengagement with said teeth of said release gear.

58. A brake actuation assembly as in claim 53, wherein said manually actuable brake release mechanism includes a toothed release gear being rotationally coupled with said release gear mounted to the end of said clutch spring.

59. A brake actuation assembly as in claim 58, wherein said toothed release gear includes a plurality of generally axially outwardly extending ramped teeth thereon and said release structure includes a plurality of generally axially outwardly extending ramped teeth thereon, said pluralities of ramped teeth interengaging with each other to allow relative rotational movement between said toothed release gear and said release structure in an actuating direction and to non-rotatably couple said toothed release gear and said release structure in an opposite releasing direction.

60. A brake actuation assembly as in claim 58, wherein said manually actuable brake release mechanism includes a compression spring configured to resiliently maintain the interengagement of said pluralities of ramped teeth.

61. A brake actuation assembly as in claim 43, wherein said release members axially disposed on said second rotatable member between said release gear and said activation arm.

62. A brake actuation assembly as in claim 43, further comprising a sensing device constructed to measure an amount of tension present within the brake actuation linkage, said sensing device being communicated with said motor to de-energize said motor when a predetermined maximum tension is applied to the brake actuation linkage.

63. A power-driven parking brake actuation assembly for actuating a vehicle brake system via a brake activation linkage, the power-driven parking brake actuation assembly comprising:

an electric motor;

a first rotatable member operatively connected to the electric motor so as to enable the motor to rotate the first rotatable member in a brake applying rotational direction, the first rotatable member normally being prevented against rotation in a brake releasing rotational direction;

a second rotatable member rotatable relative to the first rotatable member, the second rotatable member including a brake linkage actuator connectable to the brake activation linkage movable to actuate the brake activation linkage; and a torsion clutch spring disposed between the first and second rotatable members, the torsion clutch spring being configured to contract upon initiation of rotation of the first rotatable member by the motor in the brake applying direction so as to couple the second rotatable member with the first rotatable member for affecting rotation of the second rotatable member in the brake applying direction for actuation of the brake activation linkage, the clutch spring also contracting upon initiation of rotation of the second rotatable member in the brake releasing direction so as to couple the second rotatable member with the first rotatable member for enabling the first rotatable member to prevent rotation of the second rotatable member in the brake releasing direction;

wherein the clutch spring expands upon initiation of rotation of the first rotatable member in the brake releasing direction and wherein the motor is reversible to rotate the first rotatable member in the brake releasing direction opposite the brake applying direction to expand the clutch spring and de-couple the first and second rotatable members, thus enabling the second rotatable member to rotate in the brake releasing direction.

64. A brake actuation assembly according to claim 63, further comprising a manually actuable brake release mechanism including a manually movable release member mechanically connected to the clutch spring such that manual movement of the release member expands the clutch spring to de-couple the first and second rotatable members, thus enabling the second rotatable member to rotate in the brake releasing direction.

* * * * *